Figure 1:
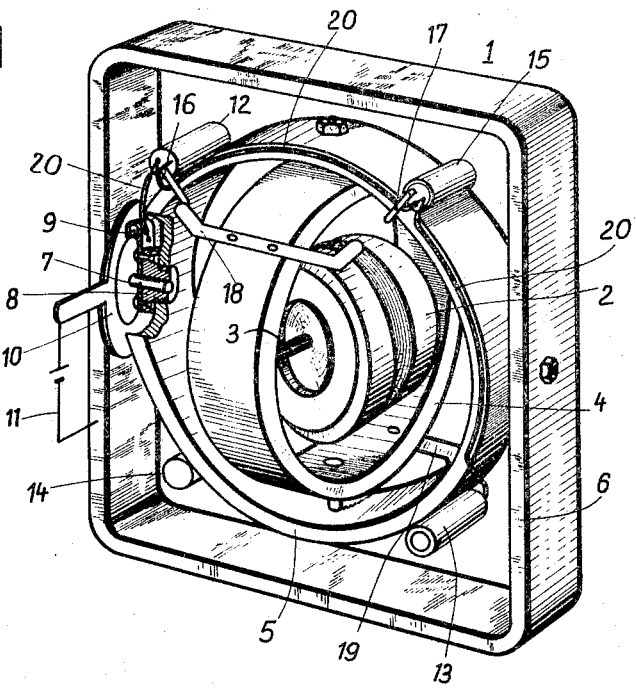

Jan. 31, 1967

W. KRANZ 3,301,069

DEVICE FOR CORRECTING THE POSITION OF
THE INNER CARDAN FRAME OF A GYROSCOPE
Filed July 10, 1963

INVENTOR

Walter Kranz

By McGlew and Toren

ATTORNEYS

United States Patent Office 3,301,069
Patented Jan. 31, 1967

3,301,069
DEVICE FOR CORRECTING THE POSITION OF THE INNER CARDAN FRAME OF A GYROSCOPE
Walter Kranz, Munich, Germany, assignor to Bolkow Gesellschaft mit beschrankter Haftung, Hamburg, Germany
Filed July 10, 1963, Ser. No. 294,465
Claims priority, application Germany, July 17, 1962, B 68,056
4 Claims. (Cl. 74—5.4)

The invention relates to a device for correcting the position of the inner Cardan frame of a gyroscope mounted on gimbals and has particular reference to a gyroscope for controlling the attitude of a missile.

The sensitivity of such gyroscopic systems to precession deflections of the gyro due to changes of attitude reaches a maximum when the two Cardan frames are arranged nearly perpendicularly to each other, and it becomes small when the two Cardan frames are adjusted nearly in parallel with another.

Correcting devices for high-quality gyroscopes, which prevent the inner Cardan frame frome migrating from its vertical position to the outer Cardan frame, are known. These correcting devices require a considerable fine-mechanical or electronic expenditure.

In the case of gyroscopes, which are designed for short-time operation and the rotors of which are driven, for instance, by means of a powder charge or by means of a cord that can be drawn off, a device for correcting the position of the inner frame of the gyro with respect to its outer frame during operation has been dispensed with for well-known types. If, however, an anomalous attitude or an impulse occurs only once during the operation of control systems equipped with such gyroscopes, said anomalous attitude or impulse causing a parallel position of the two Cardan frames, the control system will become ineffective and the body to be controlled will fail to perform its mission.

An object of the invention is to remove this drawback. Pyrotechnical impulse generators are arranged at the outer Cardan frame for correcting the position of the inner Cardan frame of a gimbal-mounted gyroscope, said impulse generators being ignitable when the inner Cardan frame migrates into a position nearly parallel to the outer Cardan frame. The ignited pyrotechnical impulse generators provide a force acting on the outer Cardan frame, said force being directed so that the inner frame is pushed back into a position nearly perpendicular to the outer Cardan frame by the precession forces of the gyroscope.

Another object of the invention is to provide contacts at the pyrotechnical impulse generators whose opposite contacts are fixed to the inner Cardan frame. The pyrotechnical impulse generators are advantageously fastened to the outer Cardan frame in such a way that the impulse generators of a simultaneously ignitable pair are parallel opposite each other and diametrically to each other. It is the result of this measure that the state of equilibrium of the outer Cardan frame is not changed by the burning down of the impulse generators.

Another object of the invention is to provide for repeated correction of the position of the inner Cardan frame by a manifold arrangement of pairs of pyrotechnical impulse generators. Since it must be possible to make these corrections in two different directions, several pairs of impulse generators, with opposite directions of action, are fixed onto the outer Cardan frame.

Another object of the invention is a reduction of the expenditure by the use of impulse generators with reversible direction of action. For this purpose the impulse generators are ignitable from two sides. When burning down they give a greater impulse on the burning-down side than they do at the end of burning down on the opposite side. This is achieved by pressing their charges into a tube which is open on both ends.

For better understanding of the invention an embodiment chosen as an example and shown in the attached drawing will now be described.

Figure 3:
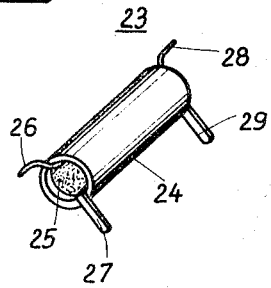
Figure 2:
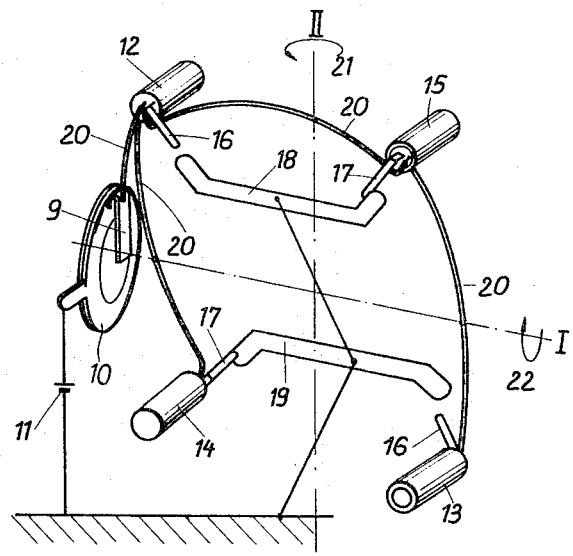

In this drawing:
FIG. 1 is a simplified representation, in an oblique view, of a directional gyroscope provided with pyrotechnical impulse generators;
FIG. 2 is an oblique view of the schematically simplified circuit and arrangement of the impulse generators;
FIG. 3 is an oblique view of an impulse generator with reversible direction of action.

FIG. 1 shows a directional gyroscope 1 in which details have been omitted for simplifying the representation, as said details do not concern the invention, for instance the device for driving the gyroscope and the device for forming the measured values.

A gyroscope 2 is mounted in an inner Cardan frame 4 and can be rotated about its axis 3. Its axis 3 is perpendicular to the axis of rotation of the inner Cardan frame 4 and perpendicular to the axis of an outer Cardan frame 5 mounted in casing 6. A pivot pin is fastened to the outer Cardan frame 5 with an insulating piece 8 that is provided with a contact spring 9 insulated with respect to the outer Cardan frame 5. Said contact spring 9 glides on an annular contact path 10. Said contact path 10 fits against contact spring 9 and is attached to casing 6 from which it is insulated. A source of current 11 is connected to the mass of the casing and to the annular contact path 10.

The diametrically arranged pairs of impulse generators 12, 13 and 14, 15 are fastened to the outer Cardan frame 5 parallel to its longitudinal axis. One connecting point in each of the ignition devices of said impulse generators is connected to contact spring 9 through lines 20. The pairs of impulse generators are provided with contacts 16 and 17 which are directed inwards and which are connected to the other connecting points of the ignition device. Said contacts 16 and 17 are insulated with respect to casing 6 and are mass-connected, when the inner Cardan frame 4, represented in its position normal to the axis of the outer Cardan frame, migrates from this position beyond an admissible angle. The mass-connection is accomplished through opposite contacts 18 and 19 which are fastened to the inner Cardan frame and are thus mass-connected. Depending on the direction of migration, either the pair of impulse generators 12, 13 or the pair of impulse generators 14, 15 is ignited. The ignition is brought about by means of fuse wires which are not shown in the drawing and which are pressed into the charges of the impulse generators 12 to 15. The ignited pair of impulse generators 12, 13 or 14, 15 supplies a force couple acting on the outer Cardan frame 5 with a predetermined magnitude and direction in such a way that the inner Cardan frame 4, which has migrated, is pressed back into a position nearly perpendicular to the outer Cardan frame 5 by the precession forces of gyroscope 2. When inner Cardan frame 4 has migrated an amount equal to the admissible angle in one direction, contact 18 will engage one contact 16, and contact 19 will engage the other contact 16. Thus current will flow from the mass-connected current source 11 to the mass through contact path 10, contact spring 9, lines 20, and the fuse wires of the igniters of the pair of impulse generators 12, 13, said fuse wires being not shown, as well as through contacts 16, 18, and 19 and will ignite the pair of impulse generators 12, 13. A force couple will then act on the outer Cardan frame (not shown in FIG. 2), said force couple trying to rotate the frame about its horizontal axis 1 in the direction of arrow 22. The rotation, however, is opposed by the precession forces of the gyroscope which are somewhat smaller than the forces resulting from impulse generators 12, 13 and which press the inner Cardan frame nearly back into its original position.

It should be noted that the thrust of impulse generator 15 is opposite to that of impulse generator 12, and that of impulse generator 14 is opposite to that of impulse generator 13. Thus each of the two possible directions of migration of the inner Cardan frame can be corrected by means of arrangements according to FIGS. 1 and 2. If the equipment is designed for more than one correction in each direction, several pairs of impulse generators can be arranged side by side at the outer Cardan frame and several pairs of opposite contacts can be arranged side by side at the inner Cardan frame, the distances between the contacts arranged at the pyrotechnical impulse generators and the opposite contacts fastened to the inner frame of the gyroscope having to be so adjusted that, if the position of the inner frame of the gyroscope must be corrected, there will first be ignited a pair of co-ordinate impulse generators, and, in the case of a further migration in the same direction, the ignition is produced by the contacts of another pair of co-ordinate impulse generators said contacts being arranged at a greater distance.

It may be that migrations of the inner Cardan frame subsequently occur several times in the same direction, while migrations in opposite direction do not occur. In these cases the pairs of impulse generators provided for corrections in the first-mentioned direction are already consumed, while the pairs of impulse generators provided for corrections in the opposite direction are not needed at all. To keep the expenditure small for such cases, too, the impulse generators have been designed in such a way that their direction of action is reversible.

FIG. 3 shows a pyrotechnical impulse generator 23 with reversible direction of action. A powder charge 25 is pressed into a tube 24, said charge being ignitable from both front sides by means of fuse wires that are pressed into charge 25 and are connected to line 26 and contact 27 and line 28 and contact 29, respectively. These impulse generators with reversible direction of action can be installed according to the embodiment of FIGS. 1 and 2, additional opposite contacts having to be arranged at the inner frame of the gyroscope.

Since certain changes may be made in the above apparatus without departing from the scope of the invention herein involved, it is intended that all matter contained in the above description or shown in the accompanying drawing shall be interpreted as illustration and not in a limiting sense.

What is claimed is:

1. A gyroscope mounted on two Cardan frame gimbals, with a device for correcting the position of the inner Cardan frame and comprising pyrotechnical impulse generators arranged at the outer Cardan frame, and means operable to ignite said impulse generators when the inner Cardan frame migrates into a position nearly parallel to the outer Cardan frame.

2. A gyroscope according to claim 1 comprising pyrotechnical impulse generators containing a charge pressed into a tube, which is open on both ends, said charge being ignitable from said both ends and producing a greater impulse on the burning-down side than on the opposite side.

3. A gyroscope mounted on two Cardan frame gimbals, with a device for correcting the position of the inner Cardan frame and comprising pyrotechnical impulse generators arranged at the outer Cardan frame, and means operable to ignite said impulse generators when the inner Cardan frame migrates into a position nearly parallel to the outer Cardan frame, said means comprising an electric ignition circuit including electrical contacts, arranged at the pyrotechnical impulse generators, and opposite contacts, fastened to the inner Cardan frame.

4. A gyroscope mounted on two Cardan frame gimbals, with a device for correcting the position of the inner Cardan frame and comprising pyrotechnical impulse generators arranged in pairs at the outer Cardan frame to extend parallel to each other and positioned diametrically opposite each other on the outer cardan frame, and means operable to ignite said impulse generators when the inner Cardan frame migrates into a position nearly parallel to the outer Cardan frame.

References Cited by the Examiner

UNITED STATES PATENTS

| | | | |
|---|---|---|---|
| 1,077,344 | 11/1913 | Hennig | 74—5.7 X |
| 2,960,876 | 11/1960 | Saphra | 74—5.7 |
| 3,069,911 | 12/1962 | Carrington et al. | 74—5.2 |

FRED C. MATTERN, JR., *Primary Examiner.*

SAMUEL FEINBERG, *Examiner.*

R. F. STAHL, *Assistant Examiner.*